Figure 1:
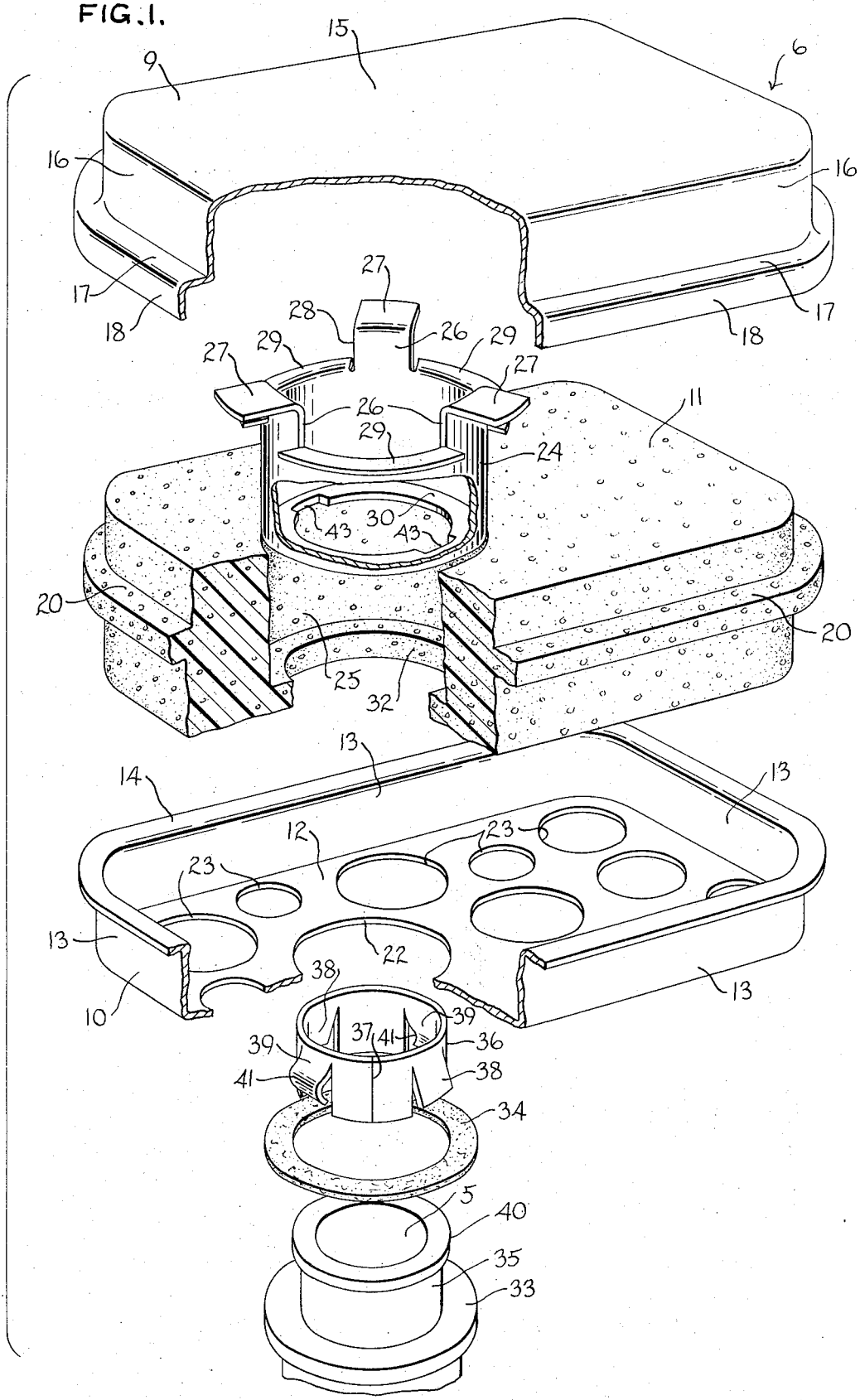

United States Patent [19]
Gumtow

[11] 3,796,027
[45] Mar. 12, 1974

[54] FASTENING FOR SMALL ENGINE CARBURETOR AIR CLEANER

[75] Inventor: Herbert A. Gumtow, Brookfield, Wis.

[73] Assignee: Briggs & Stratton Corporation, Wauwatosa, Wis.

[22] Filed: July 21, 1972

[21] Appl. No.: 274,085

[52] U.S. Cl............... 55/502, 24/213 B, 55/503, 55/504, 55/507, 55/509, 55/DIG. 28
[51] Int. Cl............................................. B01d 39/14
[58] Field of Search ...... 55/DIG. 28, 501, 502, 503, 55/504, 507, 509, 510, 522; 24/213 B

[56] References Cited
UNITED STATES PATENTS
2,999,562  9/1961  Lechtenberg.................. 55/502 X
3,167,416  1/1965  Humbert, Jr. ................. 155/510 X
3,218,785  11/1965  Tietz................................... 55/503

Primary Examiner—Frank W. Lutter
Assistant Examiner—William Cuchlinski, Jr.

[57] ABSTRACT

A carburetor air cleaner comprising a filter element confined between top and bottom shell members has a tube secured to its top wall and extending down through the filter element. The carburetor air duct has an extension projecting up into the tube through a hole in the bottom shell wall. A spring ring surrounds the extension, axially confined by a circumferential ledge on its upper end. The ring has integral fingers that press the bottom shell wall down against another circumferential ledge on the duct, and has other, curved, fingers that snap over an inturned circumferential flange on the bottom of the tube.

5 Claims, 2 Drawing Figures

FASTENING FOR SMALL ENGINE CARBURETOR AIR CLEANER

This invention relates to carburetor air cleaners for small internal combustion engines, and the invention is more particularly concerned with means for securing such an air cleaner to a carburetor air duct on which the air cleaner is installed, and for holding the components of the air cleaner readily separably assembled with one another.

On small gasoline engines it is usual to fasten an air cleaner across the air duct of the carburetor for the engine, to filter the combustion air drawn into the carburetor mixing chamber. An air cleaner of the general type of which this invention relates is disclosed in U.S. Pat. No. 2,999,562, to L. J. Lechtenberg. In general, it comprises complementary top and bottom metal shell members which enclose a filter element of polyurethane sponge or similar porous material and a rigid tubular member that extends through the filter element and has its ends in contact with the top and bottom walls of the shell to support and reinforce them. Air is drawn into the air cleaner shell through holes in its bottom wall, then passes through the filter element, which has its upper surface spaced from the top wall of the shell. The tubular member has circumferentially spaced apart cutouts or slots in its upper portion, above the level of the top surface of the filter elements and through these the filtered air flows into the interior of the tubular member and thence axially into the carburetor air duct.

The air cleaner of the Lechtenberg patent is secured in place by an elongated stud that is coaxial with the carburetor air passage and with the tubular member. At its lower end this stud is threaded into a spider-like support in the carburetor air passage. The upper end portion of the stud projects through the top wall of the top shell member and receives a nut which secures the air cleaner to the carburetor air duct and also holds the air cleaner components assembled with one another.

While very advantageous by comparison with small engine air cleaners that had previously been known, and very successful commercially, the air cleaner of the Lechtenberg patent had two disadvantages which it is an object of this invention to overcome.

One of these disadvantages was that its securement stud complicated the design of the choke butterfly as well as of the inlet portion of the carburetor body casting. Furthermore, if the stud became bent — as was easily possible — it could interfere with proper operation of the choke. However, the use of such a stud fastening has long been conventional in carburetor air cleaners for gasoline engines, and while its disadvantages were too obvious to be overlooked, they were apparently accepted as inevitable.

The other disadvantage of the air cleaner of the Lechtenberg patent was that it required a resilient grommet or sealing member of special and rather complicated shape that extended through a hole in the bottom wall of the bottom shell member and up into the rigid tubular member, and which embraced the outer end portion of the carburetor air duct. This grommet, which provided a sealing connection between the carburetor air duct and the air cleaner, was a relatively expensive molding.

By contrast with the prior constructions, the present invention has for its object to provide a means for securing an air cleaner to the carburetor body of a small gasoline engine without the need for the heretofore conventional stud, and in such a manner that it is possible to obtain a good seal between the air cleaner and the carburetor body with a simple flat annular gasket.

Consistently with its objective of materially simplifying the construction of the carburetor body of a small engine, the air cleaner, and the means connecting the same, the present invention has for another of its objects the attainment of a substantial reduction in the cost of these components, and thus of small engines generally. The invention achieves this objective to the extent of effecting a cost saving on the order of three to five cents per engine.

It is also an object of this invention to provide an air cleaner for small engines that can be disassembled and reassembled without the use of tools, to thereby facilitate the cleaning of its filter element.

With these observations and objectives in mind, the manner in which the invention achieves its purpose will be appreciated from the following description and the accompanying drawings, which exemplify the invention, it being understood that such changes in the specific apparatus disclosed herein may be made as come within the scope of the appended claims.

Figure 2:
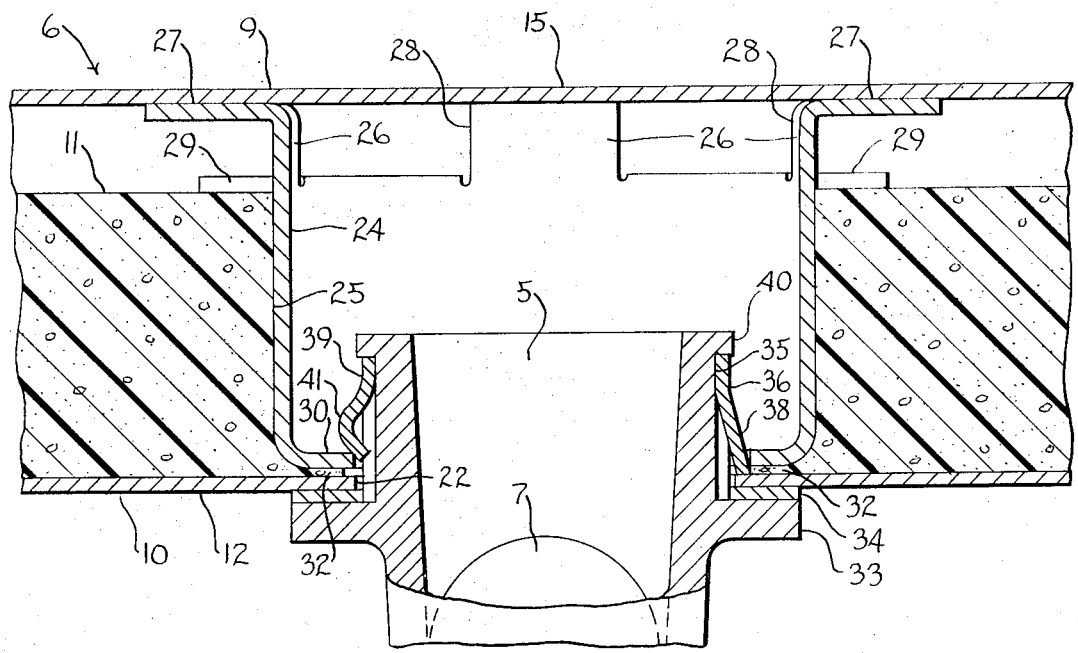

The accompanying drawings illustrate one complete example of an embodiment of the invention constructed according to the best mode so far devised for the practical application of the principles thereof, and in which:

FIG. 1 is a disassembled perspective view of an air cleaner of this invention, shown in relation to a portion of a carburetor on which it is to be installed, portions being shown broken away; and FIG. 2 is a vertical sectional view of the air cleaner and a portion of the body of a carburetor to which it is attached, the view being taken on two vertical planes which are substantially normal to one another and intersect on the axis of the air duct.

Referring now more particularly to the accompanying drawings, the numberal 5 designates the inlet end portion of a combustion air duct of a gasoline engine carburetor, upon which is installed an air cleaner 6 embodying the principles of this invention. The air duct will be recognized as part of a carburetor body that is ordinarily formed as a die casting, and its inlet portion leads to a conventional choke butterfly 7. In this instance the air duct is illustrated and described as having its inlet portion opening upwardly, but it will be understood that this is merely by way of example and that the orientation of the carburetor air inlet is not material to the present invention.

In general the air cleaner 6 comprises complementary top and bottom shell members 9 and 10 and a filter element 11 of foam polyurethane or similar resilient, spongy material.

Each of the shell members is a unitary stamping having the shape of a shallow pan. Thus the bottom shell member 10 has a flat bottom wall 12 and has a low upright side wall 13 extending all around it that terminates at its upper edge in an outwardly flared rim 14. The top shell member 9 has a generally flat top wall 15 and has a downwardly projecting side wall 16 extending all around it that terminates in a stepped rim with an outwardly projecting ledge or shoulder 17 and a downwardly projecting lip 18.

When the shell members are assembled with the filter element 11 confined between them, an integral laterally projecting ridge 20 on the filter element, about midway between its top and bottom surfaces and extending all around it, is confined under compression between the outwardly flared rim 14 on the bottom shell member and its opposing ledge or shoulder 17 on the top shell member. The compressed ridge 20 on the filter element serves as a seal between the shell members, and its outer edge is protected by the lip 18 on the top shell member.

The top shell member can be imperforate. The bottom wall 12 of the bottom shell member has one rather large hole 22 that provides for connection and communication with the carburetor air inlet, as described hereinafter, and has a plurality of smaller holes 23 through which air can enter the filter element.

A rigid tubular member 24, somewhat larger in diameter than the carburetor air duct, extends between the top wall 15 of the top shell member and the bottom wall 12 of the bottom shell member, through a closely fitting hole 25 in the filter element. The upper portion of the tubular member is axially notched to define a plurality of circumferentially spaced fingers 26, the tip portions of which are turned radially outwardly to provide lugs 27 which are flatwise secured to the underside of the top wall 15 of the top shell member, as by spot welding. The notches or spaces 28 between the fingers 26 permit air to pass between them in flowing into the interior of the tubular member and thence into the carburetor air duct. It will be observed that the height of the filter element is such that its top surface is spaced below the top shell wall 15 to permit filtered air to flow across it and into the tubular member. Flange-like radially outward projections 29 at the bottoms of the notches or cutouts 28 in the tubular member overlie the upper surface of the filter element around the hole 25 therein and cooperate with the ridge 20 thereon in confining the filter element against upward displacement in the air cleaner shell.

At its bottom the tubular member 24 has a radially inturned circumferential flange 30 that overlies the bottom wall 12 of the shell. Around the hole 25 in the filter element, at the bottom thereof, the filter element has a radially inwardly projecting circumferential ridge 32 which is compressively confined between the flange 30 on the tubular member and the bottom wall 12 of the shell, to provide a seal between them.

According to the present invention, the carburetor air duct has a circumferential radially outwardly projecting flange 33 which is preferably formed integrally with the carburetor body and upon which the bottom shell member 10 rests. More specifically the flange 33 is overlain by that portion of the bottom wall 12 which is marginal to the large hole 22 therein. A flat annular gasket 34 is confined between the flange 33 and the shell wall 12 to provide a seal between them.

On the carburetor air duct there is a collar-like extension 35 which is preferably formed integrally with the duct and which projects axially beyond the flange 33 and into the tubular member 24. Embracing this extension in an axially deep spring ring 36 that secures the air cleaner to the air duct and also serves to hold the air cleaner assembled. The spring ring is confined against axial outward displacement relative to the extension 35 by a circumferential shoulder on the outer end of the extension, defined by an integral ledge-like radially outward projection 40 thereon. The spring ring can nevertheless be installed and removed over the ledge 40 by reason of the fact that the spring ring has an axially extending slit 37 all the way along one side of it so that it can be radially expanded.

Formed integrally with the spring ring are two sets of spring fingers, respectively designated 38 and 39, all of which project obliquely axially toward the flange 33 and radially outwardly. The fingers of each set are circumferentially spaced from one another.

The fingers 38 are generally straight and have their tips engaged with the upper surface of the bottom wall 12 of the shell, adjacent to the hole 22 therein, to press that shell wall down toward the flange, compressing the gasket 34 and securing the bottom shell member to the air duct 5.

Each of the flanges 39 is curved along its length, as at 41, to have a convex radially outer surface. The fingers 39 engage over the inturned flange 30 on the bottom of the tubular member 24, and since that member is permanently secured to the top shell member, the fingers 39 thus serve to hold the components of the air cleaner assembled with one another.

The bottom shell member is placed on the flange 33 — or, more accurately, over the gasket 34 which overlies that flange — before the spring ring is assembled with the air duct extension 35. When the spring ring is put in place, downward pressure may have to be exerted on the bottom shell member to compress the gasket slightly, since the straight spring fingers 38 very snugly engage the bottom wall 12 of the shell, holding it very tightly. Normally there is no occassion to remove the bottom shell member from the air duct, but if it should have to be taken off, it can be released by radially expanding the spring ring and drawing it up over the ledge 40 on the air duct extension.

With the filter element in place in the bottom shell member, and with the tubular member permanently secured to the top shell member, the top shell member can be readily installed merely by pushing it down until the curved spring fingers 39 snap over the inturned flange 30 on the bottom of the tubular member. The air cleaner can be disassembled just as readily, by forcing the top shell member upward to cause the spring fingers 39 to be cammingly retracted by the flange 30 until that flange can pass them.

To prevent the flange 30 from compressing the spring fingers 38 and thus freeing the bottom shell member as the top one is being installed, there are notches or cutouts 43 in the inturned flange 30, of such size and so located as to just clear the spring fingers 38.

From the foregoing description taken with the accompanying drawings it will be apparent that this invention provides very simple and inexpensive means for securing an air cleaner to the air duct of a carburetor and for holding the air cleaner assembled in a manner which permits it to be readily disassembled for servicing of its filter element.

Those skilled in the art will appreciate that the invention can be embodied in forms other than as herein disclosed for purposes of illustration.

The invention is defined by the following claims:

1. The combination of an internal combustion engine carburetor having a combustion air duct, and an air cleaner which is secured over an inlet end of said duct and which comprises top and bottom complementary shell members enclosing a filter element and a substantially rigid tubular member which extends between the shell member and through the filter element concentrically to the duct, characterized by:

A. an integral flange on the exterior of said duct that is spaced from said end thereof and defines a circumferential surface axially facing said end of the duct, which surface is sealingly overlain by a marginal edge portion of a wall of the bottom shell member;

B. a ring embracing said duct axially outwardly of said flange and having a plurality of integral circumferentially spaced resilient fingers that project obliquely radially outwardly and axially toward said flange;
   1. certain of said fingers having their free ends engaged with said marginal edge portion of the bottom shell member to sealingly confine it against the flange, and
   2. others of said fingers being curved along their lengths to have convex radially outer surface portions;

C. cooperating means on said ring and on the exterior of the duct for confining the ring against axially outward displacement relative to the duct;

D. said tubular member having circumferential edge portions which compress said other fingers radially inwardly as the tubular member is moved axially toward the flange and over which said other fingers engage when the tubular member is seated on said marginal edge portion of the bottom shell member, to releasably confine the tubular member against displacement; and E. said tubular member being secured to the top shell member so that the latter is held in place in consequence of confinement of the tubular member by said other fingers.

2. The combination of claim 1, wherein the ring has an axial slit along the full length thereof and wherein said member for releasably confining the ring against axially outward displacement relative to the duct comprises:

radially outwardly projecting ledge means on said end of the duct which engages the axially outer edge of said ring.

3. The combination of claim 1, further characterized by:

a flat annular gasket confined between said flange and said marginal edge portion of said wall of the bottom shell member.

4. The combination of claim 1, further characterized by:

said circumferential edge portions on the tubular member being defined by a radially inwardly projecting circumferential flange thereon which flatwise overlies said marginal edge portion of said wall of the bottom shell member.

5. In an internal combustion engine having a carburetor with an air duct and having an air cleaner secured across an inlet end of said duct and comprising complementary top and bottom shell members, a filter element enclosed by said shell members, and a rigid tubular member which extends between walls of the shell members through the filter element and which is coaxial with the air duct, means for securing the air cleaner to the air duct and for holding the components of the air cleaner releasably assembled with one another, the last mentioned means comprising:

A. means on the air duct defining
   1. a circumferential radially outwardly projecting flange,
   2. an extension of the duct which projects axially beyond the flange and into the air cleaner through a hole in a wall of the bottom shell member, and
   3. radially outwardly projecting ledge means on the outer end of said extension, spaced from the flange;

B. an axially slitted spring ring embracing said extension and confined against axial displacement by said ledge means, said spring ring having a plurality of circumferentially spaced integral fingers that project obliquely toward said flange and radially outwardly,
   1. certain of said fingers having their free ends engaged with said wall of the bottom shell member adjacent to the hole therein, to confine the same against the flange, and
   2. others of said fingers being curved along their lengths to have convex radially outer surfaces; and C. the tubular member
   1. having a radially inwardly projecting circumferential flange which overlies said wall of the bottom shell member around said hole therein and over which said other fingers engage to releasably confine the tubular member against axial displacement, and
   2. being secured to the top shell member so that the latter is held in place by the engagement of said other fingers with the tubular member.

* * * * *